US005197094A

United States Patent [19]

Tillery et al.

[11] Patent Number: 5,197,094

[45] Date of Patent: Mar. 23, 1993

[54] SYSTEM FOR REMOTELY CREDITING AND BILLING USAGE OF ELECTRONIC ENTERTAINMENT MACHINES

[75] Inventors: Michael L. Tillery; Eugene G. Harlan; John Martin; Samuel N. Zammuto; Marcio Bonilla, all of Rockford, Ill.

[73] Assignee: Arachnid, Inc., Rockford, Ill.

[21] Appl. No.: 538,837

[22] Filed: Jun. 15, 1990

[51] Int. Cl.[5] ..................... H04M 11/00; G06F 15/28

[52] U.S. Cl. ..................................... 379/91; 379/102; 379/105; 379/106; 364/410; 273/439; 273/434

[58] Field of Search ................ 379/91, 102, 104, 105, 379/106, 107; 235/381; 273/439, 434, 138 A; 364/412, 410; 358/86

[56] References Cited

U.S. PATENT DOCUMENTS

| | | | |
|---|---|---|---|
| 4,232,295 | 11/1980 | McConnell | 340/162 |
| 4,335,809 | 6/1982 | Wain | 364/900 |
| 4,521,014 | 6/1985 | Sitrick | 273/1 GC |
| 4,572,509 | 2/1986 | Sitrick | 273/85 G |
| 4,582,324 | 4/1986 | Koza et al. | 273/138 A |
| 4,636,951 | 1/1987 | Harlick | 364/412 |
| 4,652,998 | 3/1987 | Koza et al. | 364/412 |
| 4,761,684 | 8/1988 | Clark et al. | 358/84 |
| 4,833,618 | 5/1989 | Verma et al. | 379/107 |
| 4,853,684 | 8/1989 | Hoppstadter | 235/381 |
| 5,051,822 | 9/1991 | Rhoades | 358/86 |

Primary Examiner—James L. Dwyer
Assistant Examiner—Jason Chan
Attorney, Agent, or Firm—Leydig, Voit & Mayer

[57] ABSTRACT

A method and apparatus for remotely crediting and billing usage of a plurality of electronic entertainment machines situated at different locations. Each electronic entertainment is connected via a transmission link to a billing computer situated at a central billing location. The establishment having an electronic entertainment machine may award credit to the electronic entertainment machine by remote control after a customer has paid for credit or the user can insert money in the machine. Each electronic entertainment machine records the number of credits that have been awarded to the machine. At a predetermined time, the billing computer polls each location via the transmission link, and the electronic entertainment machine at each location transmits credit data to the billing computer. Each location is then billed for the use of their respective electronic entertainment machines as determined by the number of awarded credits. The present invention optionally includes means for remotely activating or deactivating an electronic entertainment machine from the central billing location should the need arise. Also, one machine at a location can be a master and other machines are linked to the master to provide the crediting and billing system for all the location machines.

17 Claims, 1 Drawing Sheet

SYSTEM FOR REMOTELY CREDITING AND BILLING USAGE OF ELECTRONIC ENTERTAINMENT MACHINES

FIELD OF THE INVENTION

The present invention relates generally to remote communication with electronic entertainment machines, and more particularly to a method and apparatus for remotely crediting and billing usage of a plurality of electronic games situated at different locations.

BACKGROUND OF THE INVENTION

Heretofore, players using electronic games customarily establish game credit by inserting one or more coins, thereby enabling the game to be operated until credit has been exhausted. With such games, it is necessary for players to have a ready supply of coins in order to continue playing the game. Sometimes an establishment may provide a coin changer on location so that players may exchange their paper currency for coins. Some games may even include bill changers or accept paper currency in addition to coins.

No matter which of the above methods is implemented, the same problems still exist; currency may be accumulated in the games which is not readily accessible either to the location or other vendor owner of the machines. The location must wait for the game cash boxes to be emptied before there can be access to the currency. The delay and removal results in added cost and inconvenience. Furthermore, customers typically acquire change from the establishment, thus reducing the location's available currency even more.

Billing for usage of electronic games is also an expensive and time consuming process. Many locations do not own the electronic games that are located in their establishment. Locations may lease electronic games from the owners, i.e., vendors, of the games and share the profits received from the electronic games with the vendors.

Such a leasing arrangement typically requires a manual accounting process. Routemen employed by the vendor game owners travel to each electronic game location to check the number of times a game has been played. The number of times a game has been played is usually determined by counting the money located in the game, or by reading an electronic or mechanical counter located within the electronic game. This accounting process is generally very costly and time consuming.

It is known to connect machines in an installation to a central computer system which can interrogate each machine in the system to gather audit data collected by the machines during their normal course of operation. This audit data includes data relating to the number of times the machine has been played. Such a system enables a vendor game owner to verify readings reported by routemen, thus providing added security to the manual accounting process.

It is also common in some countries to operate machine systems wherein the player does not insert coins or tokens into the machine being played, but instead pays at a cashier on location. The cashier on receiving the appropriate payment then credits the machine either remotely by transmitting electrical pulses to the machine or by some other alternative way such as use of tokens exchanged for coins and other currency. Such systems avoid having to either empty the game cash boxes or taking coins out of circulation.

OBJECTS AND SUMMARY OF THE INVENTION

Accordingly, it is a primary object of the present invention to provide a method and apparatus for remotely crediting and billing usage of a plurality of electronic games situated at different locations, thus eliminating the need for routemen to manually empty game cash boxes and determine the number of times each game has been played. The present invention enables all accounting and billing of game usage to be handled from a remote location.

Another object of the present invention is to provide more efficient use of currency. Instead of tying up establishments' currency in game cash boxes, the present invention enables locations to either access the cash boxes as they may require to recirculate the coins and currency or even to remotely credit electronic games after being paid by customers. This enables all game profits to be immediately available to the locations.

A further object of the present invention is to provide complete handling of financial affairs from a remote location. The present invention enables vendor game owners to remotely acquire game usage data, bill for game usage, and terminate services if necessary.

While the invention will be described in connection with the preferred embodiment, there is no intent to limit it to that embodiment. On the contrary, the intent is to cover all alternatives, modifications and equivalents included within the spirit an scope of the invention as defined by the appended claims.

BRIEF DESCRIPTION OF THE DRAWING

The FIGURE is a block diagram of the preferred embodiment of the present invention. The block diagram illustrates two locations with an electronic entertainment machine and a remote controller at each location. Each electronic entertainment machine is connected to the central billing location via a transmission link. The block diagram, however, is intended to depict that a plurality of electronic entertainment machines can be connected to the central billing location via the transmission link.

DESCRIPTION OF THE PREFERRED EMBODIMENT

Figure 1:
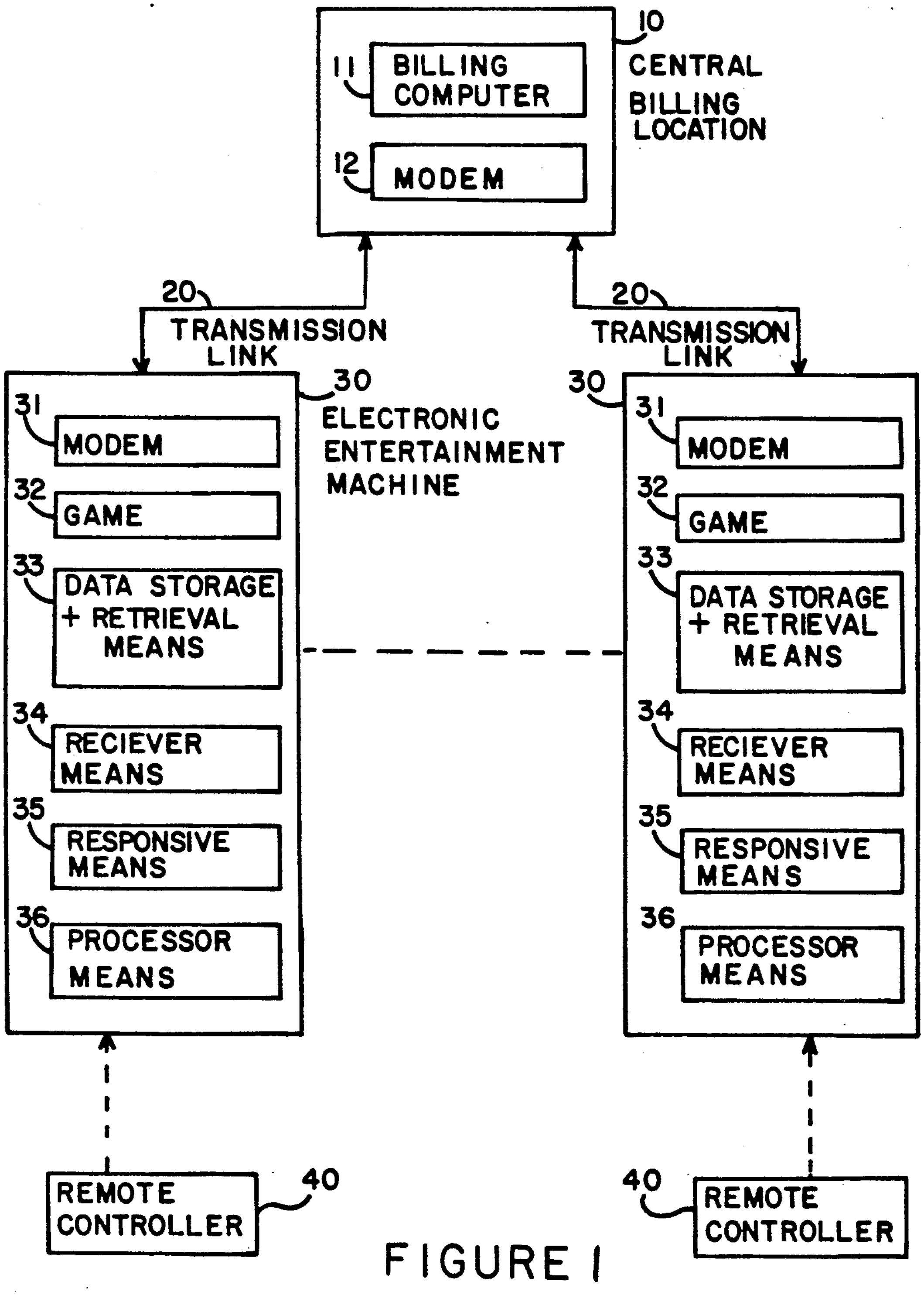

Turning now to the drawing, the FIGURE is a block diagram of the present invention. The present invention includes a central billing location 10 at which is located a billing computer 11. The billing computer 11 includes a modem 12 which enables the billing computer 12 to utilize transmission link 20. In the preferred embodiment, the transmission link 20 is a conveniently existing cable system such as the lines of a public telephone system or the like.

The present invention may further include a plurality of electronic entertainment machines 30 situated at different locations. At least one master electronic entertainment machine 30 at a location includes a modem 31, an electronic game 32, data storage and retrieval means 33, receiver means 34, responsive means 35, and processor means 36. Each master electronic entertainment machine 30 is connected to the central billing location 10 via a transmission link 20. The processor means 36 is a microprocessor which controls all the components of the electronic entertainment machine 30. Other machines located at the same establishment can be linked to the master machine 30 which then monitors the credits and billings for such other machines.

A remote controller 40 may optionally also be situated at each location having an electronic entertainment machine 30. The remote controller 40 includes a transmitter that transmits a signal which is received by the receiver means 34 in the electronic entertainment machine 30.

In accordance with the remote crediting option of the present invention, a customer desiring to play an electronic game 32 approaches the location personnel and electronic game 32. After paying for the desired number of credits, the location uses the remote controller 40 to transmit a signal to the electronic entertainment machine 30 to set the designated number of credits on the electronic game 32.

The remote controller 40 transmits a signal specifying the number of credits to be set on the electronic game 32. This signal is received by the receiver means 34 located in the electronic entertainment machine 30. The remote controller 40 also may be hardwired to the electronic entertainment machine 30, in which case the remote controller 40 would transmit electrical signals across a wire to the receiver means 34. In the preferred optional embodiment, however, the remote controller 40 is not hardwired to the receiver means 34, but instead the remote controller 40 contains a transmitter capable of transmitting a radio signal to the receiver means 34. The receiver means 34 is a standard radio receiver capable of converting a radio signal into an electrical signal to be transmitted over a wire. Using radio signals allows for easier installation of the present invention and greater convenience for the vendor. Other forms of electromagnetic radiation may also be used such as infrared or laser transmissions.

After receiving a signal via the receiver means 34, the responsive means 35 sets the appropriate number of credits on the electronic game 32. The electronic game 32 is now operative for play. The responsive means 35 is comprised of circuitry capable of converting the electrical signal from the receiver means 34 into a command to set the proper number of credits on the electronic game 32.

The data storage and retrieval means 33 records the number credits that have been awarded to the electronic game 32. The data storage and retrieval means 33 consist of a random access memory chip (RAM) connected to a microprocessor. The RAM stores credit data until retrieval of this data is requested by the billing computer 11.

The billing computer 11 can be programmed to poll each electronic entertainment machine 30 optionally and preferably during the off-hours of the respective establishment where each electronic entertainment machine 30 is located. This period typically occurs when each respective establishment is closed. Polling each electronic entertainment machine 30 during off-hours prevents the transmission of credit data from interfering with an establishment's use of its own phone lines during business hours.

After the billing computer 11 has received the credit data from an establishment, the billing computer 11 calculates that establishment's bill for game usage. The bill for game usage is based on the number of credits awarded to the electronic game 32 during a billing period. A billing statement is printed for services (either manually or as an automatic feature of the billing computer) which is then mailed to the respective establishment.

The present invention also provides means for remotely deactivating an electronic entertainment machine 30 should an establishment fail to make or become untimely with its payments.

The processor means 36 can deactivate the electronic entertainment machine 30 upon receiving a deactivation signal from the billing computer 11. The processor means 36 is also programmed to require a reactivation code during a designated period of time. This designated period of time may be the billing cycle. Each time billing computer 11 polls an electronic entertainment machine 30 requesting credit data, the billing computer also transmits the reactivation code. If the processor means 36 does not receive this reactivation code during the designated period of time (for example, because the phone line was disconnected from the electronic entertainment machine 30 in an attempt to prevent remote deactivation), the processor means 36 automatically deactivates the electronic entertainment machine 30. Therefore, the owner of the electronic entertainment machine 30 can terminate services without having to remove the electronic entertainment machine for the premises.

The present invention enables the owner of electronic entertainment machines 30 to remotely handle all financial affairs concerning the leasing or operating of electronic entertainment machines 30 at one or more locations. This improved efficiency in the billing process results in lower costs and greater convenience for all involved.

We claim as our invention:

1. An apparatus for remotely crediting and billing usage of electronic entertainment machines in establishments at different locations, which comprises:

an electronic game located within an electronic entertainment machine;

means for processing located inside the electronic entertainment machine which controls the electronic entertainment machine;

a modem located inside the electronic entertainment machine which enables communication over a transmission link;

means for storing and retrieving data located inside the electronic entertainment machine which stores and retrieves data regarding a number of credits awarded to the electronic game;

a billing computer including a modem at a central billing location, wherein the billing computer polls each electronic entertainment machine via the transmission link to request transmission of the credit data, and after receiving the credit data the billing computer calculates a game usage bill for each establishment based on the credit data for respective usage of the electronic game as determined by the number of credits awarded thereto; and wherein the electronic entertainment machine is deactivated if the processor means does not receive a reactivation code via the transmission link during a designated period of time.

2. An apparatus as claimed in claim 1 further including:

means for receiving a signal located within the electronic entertainment machine;

means responsive to receiving the signal which converts the signal into a command signal setting a requested number of credits available for game play on the electronic game; and a remote controller located at each establishment having an electronic entertainment machine, wherein the remote controller sends the signal to the receiving means to indicate an award of a number of credits available for game play.

3. An apparatus for remotely crediting and billing usage of electronic entertainment machines as set out in claim 2, wherein the signal transmitted by the remote controller is electromagnetic radiation.

4. An apparatus for remotely crediting and billing usage of electronic entertainment machines as set out in claim 1, wherein the transmission link is non-dedicated public telephone lines.

5. An apparatus for remotely crediting and billing usage of electronic entertainment machines as set out in claim 4, wherein software controlling the billing computer directs the billing computer to poll each electronic entertainment machine during off-hours of establishments in which the electronic entertainment machines are located, and transmission of credit data is via telephone lines which does not interfere with the establishments' use of their own phone lines.

6. A method of remotely crediting and billing usage of electronic entertainment machines, which comprises:

providing an electronic entertainment machine in an establishment, the electronic entertainment machine including an electronic game, means for processing which controls the electronic entertainment machine, a modem for communicating over a transmission link, and storage means for storing and retrieving data;

storing credit data regarding a number of credits awarded to the electronic game in the storage means associated therewith, the number of credits corresponding to usage thereof;

providing a billing computer including a modem for communicating over the transmission link, the billing computer situated at a central billing location;

polling the electronic entertainment machine with the central billing computer via the transmission link to request transmission of the credit data stored in the storage means thereof;

retrieving the credit data from the storage means associated with the electronic entertainment machine, and transmitting the credit data to the central billing computer via the transmission link;

billing the establishment based on the credit data for respective usage of the electronic game as determined by the number of credits awarded thereto; and deactivating the electronic entertainment machine via the transmission link from the central billing location should the need arise to discontinue services to the establishment, wherein the electronic entertainment machine is deactivated if the processor means does not receive a reactivation code via the transmission link during a designated period of time.

7. The method of remotely crediting and billing usage of electronic entertainment machines as set out in claim 6, wherein the electronic entertainment machine include means for receiving a signal and means responsive to receiving the signal and said method further comprises:

transmitting the signal from a remote controller to the receiving means wherein the signal indicates an award of a number of credits available for game play to the electronic game, and responding to the signal via the responsive means by setting the number of credits available for game play on the electronic game.

8. The method of remotely crediting and billing usage of electronic entertainment machines as set out in claim 7, wherein the signal transmitted by the remote controller is electromagnetic radiation.

9. The method of remotely crediting and billing usage of electronic entertainment machines as set out in claim 6, wherein the transmission link if non-dedicated public telephone lines.

10. The method of remotely crediting and billing usage of electronic entertainment machines as set out in claim 6, wherein the transmission link is dedicated public telephone lines.

11. The method of remotely crediting and billing usage of electronic entertainment machines as set out in claim 9, wherein software controlling the billing computer directs the billing computer to poll each electronic entertainment machine during off-hours of establishments in which the electronic entertainment machines are located, whereby transmission of credit data via the public telephone lines does not interfere with the establishments' use of their own phone lines.

12. A method of remotely crediting and billing usage of electronic entertainment machines, which comprises:

providing a master electronic entertainment machine in an establishment, the master electronic entertainment machine including an electronic game, means for processing which controls the electronic entertainment machine, a modem for communicating over a transmission link, and storage means for storing and retrieving data;

providing another electronic entertainment machine including an electronic game which is linked to the master machine;

storing credit data regarding a number of credits awarded to the electronic games in the master machine and the other machine in the storage means associated with the master machine, the number of credits corresponding to usage thereof;

providing a billing computer including a modem for communicating over the transmission link, the billing computer is situated at a central billing location;

polling the master electronic entertainment machine with the central billing computer via the transmission link to request transmission of the credit data stored in the storage means thereof;

retrieving the credit data from the storage means associated with the master electronic entertainment machine, and transmitting the credit data to the central billing computer via the transmission link; and billing the establishment based on the credit data for respective usage of the electronic games as determined by the number of credits awarded thereto.

13. An apparatus for remotely crediting and billing usage of electronic entertainment machines in establishments at different locations, which comprises:

a master electronic entertainment machine at an establishment;

an electronic game located within the master electronic entertainment machine;

means for processing located inside the master electronic entertainment machine which controls the electronic entertainment machine;

a modem located inside the master electronic entertainment machine which enables communication over a transmission link;

another electronic entertainment machine including an electronic game which is linked to the master machine;

means for storing and retrieving data located inside the master electronic entertainment machine which stores and retrieves data regarding a number of credits awarded to the electronic games in the master machine and the other machine;

a billing computer including a modem at a central billing location, wherein the billing computer polls each master electronic entertainment machine via the transmission link to request transmission of the credit data, and after receiving the credit data the billing computer calculates a game usage bill for the establishment based on the credit data for respective usage of the electronic games as determined by the number of credits awarded thereto.

14. A method of remotely crediting and billing usage of electronic entertainment machines, which comprises:

providing an electronic entertainment machine in an establishment, the electronic entertainment machine including an electronic game, means for processing which controls the electronic entertainment machine, a modem for communicating over a transmission link, and storage means for storing and retrieving data;

storing data regarding revenue generated by the electronic game in the storage means associated therewith;

providing a billing computer including a modem for communicating over the transmission link, the billing computer situated at a central billing location;

polling the electronic entertainment machine with the central billing computer via the transmission link to request transmission of the revenue data stored in the storage means thereof;

retrieving the revenue data from the storage means associated with the electronic entertainment machine, and transmitting the revenue data to the central billing computer via the transmission link;

billing the establishment based on the revenue data for the electronic game; and deactivating the electronic entertainment machine via the transmission link from the central billing location should the need arise to discontinue services to the establishment, wherein the electronic entertainment machine is deactivated if the processor means does not receive a reactivation code via the transmission link during a designated period of time.

15. An apparatus for remotely crediting and billing usage of electronic entertainment machines in establishments at different locations, which comprises:

an electronic game located within an electronic entertainment machine;

means for processing located inside the electronic entertainment machine which controls the electronic entertainment machine;

a modem located inside the electronic entertainment machine which enables communication over a transmission link;

means for storing and retrieving data located inside the electronic entertainment machine which stores and retrieves data regarding revenue generated by the electronic game;

a billing computer including a modem at a central billing location, wherein the billing computer polls each electronic entertainment machine via the transmission link to request transmission of the revenue data, and after receiving the revenue data the billing computer calculates a bill for each establishment based on the revenue data for each electronic game; and wherein the electronic entertainment machine is deactivated if the processor means does not receive a reactivation code via the transmission link during a designated period of time.

16. A method of remotely crediting and billing usage of electronic entertainment machines, which comprises:

providing a master electronic entertainment machine in an establishment, the master electronic entertainment machine including an electronic game, means for processing which controls the electronic entertainment machine, a modem for communicating over a transmission link, and storage means for storing and retrieving data;

providing another electronic entertainment machine including an electronic game which is linked to the master machine;

storing revenue data for the electronic games in the master machine and the other machine in the storage means associated with the master machine;

providing a billing computer including a modem for communicating over the transmission link, the billing computer is situated at a central billing location;

polling the master electronic entertainment machine with the central billing computer via the transmission link to request transmission of the revenue data stored in the storage means thereof;

retrieving the revenue data from the storage means associated with the master electronic entertainment machine, and transmitting the revenue data to the central billing computer via the transmission link; and billing the establishment based on the revenue data for the electronic games.

17. An apparatus for remotely crediting and billing usage of electronic entertainment machines in establishments at different locations, which comprises:

a master electronic entertainment machine at an establishment;

an electronic game located within the master electronic entertainment machine;

means for processing located inside the master electronic entertainment machine which controls the electronic entertainment machine;

a modem located inside the master electronic entertainment machine which enables communication over a transmission link;

another electronic entertainment machine including an electronic game which is linked to the master machine;

means for storing and retrieving data located inside the master electronic entertainment machine which stores and retrieves data regarding revenue generated by the electronic games in the master machine and the other machine;

a billing computer including a modem at a central billing location, wherein the billing computer polls each master electronic entertainment machine via the transmission link to request transmission of the revenue data, and after receiving the revenue data the billing computer calculates a bill for the establishment based on the revenue data for each electronic game.

* * * * *

UNITED STATES PATENT AND TRADEMARK OFFICE
CERTIFICATE OF CORRECTION

PATENT NO. : 5,197,094

DATED : March 23, 1993

INVENTOR(S) : MICHAEL L. TILLERY, EUGENE G. HARLAN, JOHN MARTIN, SAMUEL N. ZAMMUTO AND MARCIO BONILLA

It is certified that error appears in the above-identified patent and that said Letters Patent is hereby corrected as shown below:

Column 3, line 12, after "and" insert -- requests that a specific number of credits be set on the --.

Signed and Sealed this

Twentieth Day of September, 1994

*Attest:*

BRUCE LEHMAN

*Attesting Officer* *Commissioner of Patents and Trademarks*